(12) United States Patent
Li (10) Patent No.: US 9,588,393 B2
(45) Date of Patent: Mar. 7, 2017

(54) LIQUID CRYSTAL PANEL AND METHOD OF MANUFACTURING THE SAME, DISPLAY DEVICE

(71) Applicant: BOE TECHNOLOGY GROUP CO., LTD., Beijing (CN)

(72) Inventor: Mingchao Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 222 days.

(21) Appl. No.: 14/377,793

(22) PCT Filed: Dec. 18, 2013

(86) PCT No.: PCT/CN2013/089828
§ 371 (c)(1),
(2) Date: Aug. 8, 2014

(87) PCT Pub. No.: WO2015/027642
PCT Pub. Date: Mar. 5, 2015

(65) Prior Publication Data
US 2015/0309343 A1    Oct. 29, 2015

(30) Foreign Application Priority Data
Sep. 2, 2013  (CN) .......................... 2013 1 0392991

(51) Int. Cl.
*G02F 1/1333*    (2006.01)
*G02F 1/137*     (2006.01)
(Continued)

(52) U.S. Cl.
CPC ............. *G02F 1/137* (2013.01); *B05D 1/005* (2013.01); *C09K 19/0225* (2013.01);
(Continued)

(58) Field of Classification Search
None
See application file for complete search history.

(56) References Cited

U.S. PATENT DOCUMENTS

| 7,248,318 B2 | 7/2007 | Nakamura et al. |
| 2003/0148264 A1 | 8/2003 | Held et al. |

(Continued)

FOREIGN PATENT DOCUMENTS

| CN | 1462898 A | 12/2003 |
| CN | 1934224 A | 3/2007 |

(Continued)

OTHER PUBLICATIONS

English Translation of the International Search Report of PCT/CN2013/089828 published in English on Mar. 5, 2015.
(Continued)

*Primary Examiner* — Richard Kim
(74) *Attorney, Agent, or Firm* — Collard & Roe, P.C.

(57) ABSTRACT

A liquid crystal panel comprises an array substrate and an opposing substrate that is opposite to the array substrate; a polymer dispersed blue phase layer configured to serve as an alignment layer is formed on the array substrate; and at least two electrodes are provided on the array substrate. The liquid crystal panel can omit a rubbing process for an alignment layer on a side of an array substrate, and resolve the problem of the dark-state light leakage of the liquid crystal panel. A method of manufacturing a liquid crystal panel is further disclosed.

16 Claims, 5 Drawing Sheets

(51) Int. Cl.
- *G02F 1/1334* (2006.01)
- *B05D 1/00* (2006.01)
- *C09K 19/02* (2006.01)
- *G02F 1/00* (2006.01)
- *G02F 1/1337* (2006.01)
- *G02F 1/1343* (2006.01)
- *C09K 19/54* (2006.01)

(52) U.S. Cl.
CPC ........ *C09K 19/0275* (2013.01); *G02F 1/0027* (2013.01); *G02F 1/0045* (2013.01); *G02F 1/1334* (2013.01); *G02F 1/133711* (2013.01); *C09K 2019/548* (2013.01); *G02F 1/134363* (2013.01); *G02F 2001/13793* (2013.01)

(56) References Cited

U.S. PATENT DOCUMENTS

| | | | | |
|---|---|---|---|---|
| 2007/0200093 | A1* | 8/2007 | West | B82Y 20/00 252/299.01 |
| 2012/0120351 | A1 | 5/2012 | Kawata | |
| 2013/0016312 | A1* | 1/2013 | Kim | G02F 1/137 349/97 |
| 2013/0271713 | A1 | 10/2013 | Miyake et al. | |
| 2014/0111759 | A1 | 4/2014 | Yang et al. | |
| 2016/0017226 | A1* | 1/2016 | Fujisawa | G02F 1/134363 349/33 |

FOREIGN PATENT DOCUMENTS

| | | |
|---|---|---|
| CN | 102952551 A | 3/2013 |
| CN | 103154809 A | 6/2013 |
| CN | 103215050 A | 7/2013 |
| KR | 2001-0098096 A | 11/2001 |
| WO | 03004604 A2 | 1/2003 |

OTHER PUBLICATIONS

International Search Report, International Preliminary Report on Patentability and Written Opinion of the International Searching Authority of PCT/CN2013/089828 in Chinese, mailed Jun. 11, 2014.

Chinese Office Action of Chinese Application No. 201310392991.8, mailed Jun. 30, 2015 with English translation.

English translation of the International Preliminary Report on Patentability and Written Opinion of the International Searching Authority of PCT/CN2013/089828, issued Mar. 8, 2016.

* cited by examiner

LIQUID CRYSTAL PANEL AND METHOD OF MANUFACTURING THE SAME, DISPLAY DEVICE

CROSS REFERENCE TO RELATED APPLICATIONS

This application is the National Stage of PCT/CN2013/089828 filed on Dec. 18, 2013, which claims priority under 35 U.S.C. §119 of Chinese Application No. 201310392991.8 filed on Sep. 2, 2013, the disclosure of which is incorporated by reference.

TECHNICAL FIELD

Embodiments of the present invention relate to a liquid crystal panel and a method of manufacturing the same, and a display device.

BACKGROUND

An advanced-super dimension switch (ADS) technology is a wide view angle technology developed to resolve the application problems of large-sized high definition desktop displays and liquid crystal televisions in the liquid crystal display field, that is, a technology that is generally called as hard screen technology at present. The ADS technology generates a multi-dimensional electric field with the electrodes in pixels in a same plane, makes the aligned liquid crystal molecules between electrodes and over the electrodes all generate rotations, and thus increases the light transmittance of a liquid crystal layer. The ADS technology overcomes the problem of low light transmittance of a conventional in-plane switch technology, and achieves high light transmittance on the premise of a wide view angle. The main advantages of the ADS technology include: no color shift in all observation directions, high color reduction, no push mura phenomenon in the case of pushing, super-wide view angle, fast response speed, high contrast ratio, and low power consumption.

At present, a method of manufacturing an ADS type liquid crystal panel comprises: fabricating an alignment layer, polyimide (PI) layer, on an array substrate obtained from an array manufacturing process; performing a rubbing process upon the PI layer formed on the array substrate; forming grooves in a certain direction on the PI layer to provide a certain pretilt angle to achieve an alignment function for liquid crystal molecules. The process for the PI layer is a rubbing process, and because the surface heights of the array substrate are uneven, the depths of the grooves formed in regions with height difference on the array substrate in the rubbing process are different, and this may cause dark-state light leakage in the operation of a liquid crystal panel.

To sum up, the rubbing process during the fabrication of an ADS type liquid crystal panel in the existing technology may lead to dark-state light leakage, and thus affects the contrast ratio of a liquid crystal panel and makes the whole display quality of the liquid crystal panel degraded.

SUMMARY

Embodiments of the present invention provide a liquid crystal panel and a method of manufacturing the same, and a display device, which can omit a rubbing process on a side of an array substrate in the current technology, and resolve the problem of the dark-state light leakage of a liquid crystal panel.

An aspect of the present invention provides a liquid crystal panel, and the liquid crystal panel comprises an array substrate and an opposing substrate that is opposite to the array substrate, a polymer dispersed blue phase layer configured to serve as an alignment layer is formed on the array substrate; and at least two electrodes are provided on the array substrate.

Another aspect of the present invention provides a method of manufacturing a liquid crystal panel, and the method comprises: providing a polymer dispersed blue phase layer on an array substrate, on which at least two electrodes are provided; performing a cell-assembly process with the array substrate on which the polymer dispersed blue phase layer is provided and an opposing substrate to form a liquid crystal cell.

A further aspect of the present invention provides a display device, which comprises the aforementioned liquid crystal panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Embodiments of the present invention provide a liquid crystal panel and a method of manufacturing the same, and a display device, which can omit a rubbing process upon a side of an array substrate in the existing technology and resolve the problem of the dark-state light leakage of a liquid crystal panel.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

An embodiment of the present invention provides a liquid crystal panel, and the liquid crystal panel comprises: an array substrate and an opposing substrate that is opposite to the array substrate; a polymer dispersed blue phase layer configured to serve as an alignment layer is formed on the array substrate; and at least two electrodes are provided on the array substrate.

The above-mentioned array substrate may be an IPS (In-plane Switch) type array substrate or an ADS type array substrate, and in this way, the at least two electrodes on the array substrate may be a pixel electrode and a common electrode in a pixel unit; and the pixel electrode and the common electrode can generate a planar electric field or a multi-dimensional electric field on the surface of the array substrate after powered up, and then control the liquid crystal in the polymer dispersed blue phase layer and the liquid crystal between the array substrate and the opposing substrate to generate rotations. The rotations of the liquid crystal between the array substrate and the opposing substrate realize the display of the liquid crystal panel.

The array substrate of the embodiment of the present invention comprises a plurality of gate lines and a plurality of data lines, and these gate lines and data lines cross with each other and thus define pixel units arranged in an array; and each pixel unit comprises a thin film transistor serving as a switching element and a pixel electrode and a common electrode that are used to control the alignment of the liquid crystal. For example, a gate electrode of a thin film transistor of each pixel and a corresponding gate line are electrically connected or integrally formed, a source electrode thereof and a corresponding data line are electrically connected or integrally formed, and a drain electrode thereof and a corresponding pixel electrode are electrically connected or integrally formed. The following descriptions mainly relate to a single pixel unit or a plurality of pixel units, but the rest pixel units can form uniformly.

Preferably, the opposing substrate is a color filter substrate, and here the color filter layer of the liquid crystal panel is fabricated on the opposing substrate. In addition, the color filter layer may also be fabricated on the array substrate through a COA (Color-filter on Array) process, and in this case, there's no need to fabricate another color filter layer on the opposing substrate.

Preferably, the polymer dispersed blue phase system comprises polymerizable material and blue phase liquid crystal.

The polymerizable material in the polymer dispersed blue phase system may be a polymer system of acrylates, allyloxy benzoates or the like that comprise a polymerizable group, and the blue phase liquid crystal can be a nematic liquid crystal doped with a chiral agent or a polymer system comprising an active double bond.

Preferably, for example, the blue phase liquid crystal in the polymer dispersed blue phase system comprises ferroelectric particles, and the ferroelectric particles can reduce the driving voltage of the polymer dispersed blue phase system effectively. For example, the ferroelectric particles are particles of a ferroelectric material such as barium titanate or the like.

Preferably, for example, the polymerizable material in the polymer dispersed blue phase system comprises nanoparticles, and the nanoparticles can improve the distribution uniformity of the particles.

A polymer dispersed blue phase system simultaneously comprising nanoparticles and ferroelectric particles can reduce the driving voltage of the polymer dispersed blue phase system more effectively.

Preferably, for example, the content of the nanoparticles in the polymerizable material is 0.5% wt of the polymerizable material, and the content of the ferroelectric particles in the blue phase liquid crystal is 0.3% wt of the blue phase liquid crystal.

Figure 1:
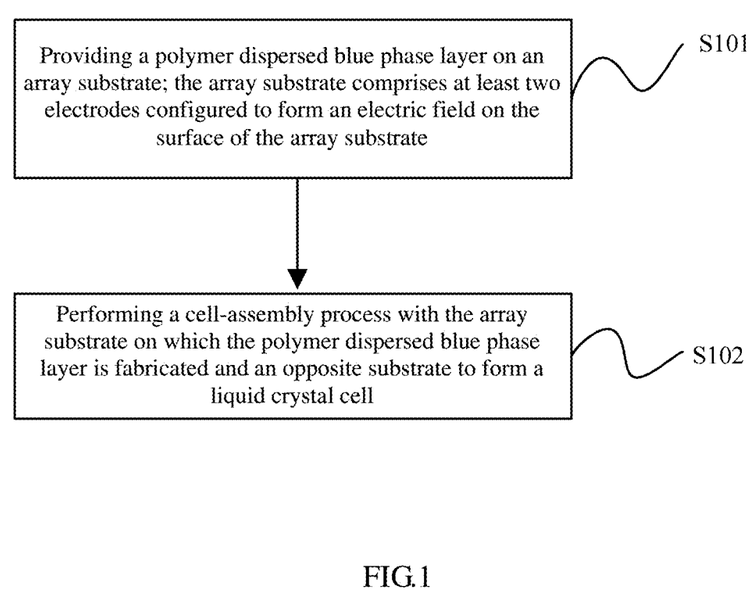
FIG. 1 is a flow chart illustrating a method of manufacturing a liquid crystal panel in an embodiment of the present invention.

As illustrated in FIG. 1, an embodiment of the present invention provides a method of manufacturing the above-mentioned liquid crystal panel, and this method can be performed as follows.

S101, providing a polymer dispersed blue phase layer on an array substrate which comprises at least two electrodes thereon; and S102, performing a cell-assembly process with the array substrate on which the polymer dispersed blue phase layer is provided and an opposing substrate to form a liquid crystal cell.

The at least two electrodes provided on the array substrate, for example, are a pixel electrode and a common electrode in a pixel unit, so as to form an electric field on the surface of the array substrate and to control the rotations of the liquid crystal in operation. The opposing substrate in the embodiment of the present invention, for example, is a color filter substrate.

Preferably, an example of providing a polymer dispersed blue phase layer on an array substrate may be that: a polymer dispersed blue phase system is formed on an array substrate, the polymer dispersed blue phase system is cured, and therefore the polymer dispersed blue phase layer is obtained.

Preferably, an example of curing the polymer dispersed blue phase system may be that: a thermocuring process is used to cure the polymer dispersed blue phase system, a thermocuring temperature can be 230±5° C., and a curing time can be 30±5 min. The mocuring temperature and the mocuring time can be adjusted according to the actual process, and are not limited to the temperature and time provided in the embodiment of the present invention. For example, the thermocuring process and the process of fabricating the color filter substrate can be performed simultaneously, and meanwhile the thermocuring process may not degrade the properties of the thin film transistor in the array substrate.

Preferably, forming a polymer dispersed blue phase system on an array substrate, for example, can be performed as follows. A spin-coating process is performed to provide the polymer dispersed blue phase system on the array substrate; or, the polymer dispersed blue phase system is formed on the array substrate by using a one drop fill (ODF) method. The uniformity of the polymer dispersed blue phase layer can be increased by application of the ODF method to form the polymer dispersed blue phase system, and meanwhile the alignment effect of the polymer dispersed blue phase layer can be improved.

In the abovementioned step S102, the process of performing a cell-assembly process with the array substrate and an opposing substrate comprises processes of dripping the liquid crystal onto the opposing substrate and assembling the array substrate and the opposing substrate with sealant, and the detailed description thereof is omitted herein.

Descriptions will be given in the following in connection with specific embodiments.

Figure 2:
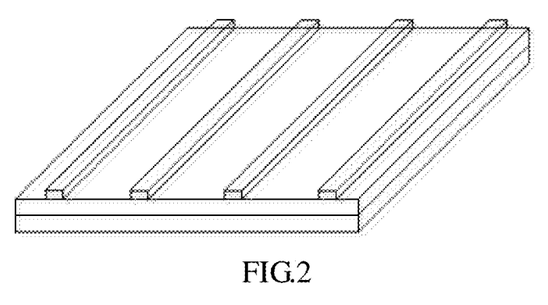
FIG. 2 is a schematic view illustrating an array substrate fabricated in an embodiment of the present invention.

Firstly, an array substrate is fabricated through a complete set of array manufacturing processes, and the fabricated array substrate is illustrated in FIG. 2. The array substrate can be an ADS type array substrate or an IPS type array substrate, and the process of fabricating the array substrate may be the same as the conventional technology; and the detailed description thereof is omitted herein. Or, the above-mentioned array substrate can be obtained from another person. On the array substrate as illustrated in FIG. 2, thin film transistors, pixel electrodes and the like structures are formed, and these structures do not relate to the improvements of the present invention, so they are not definitely illustrated in FIG. 2.

Polymer dispersed blue phase (PDBP) is a kind of polymer dispersed liquid crystal (PDLC). A polymer dispersed liquid crystal film is a film material with excellent over-all properties and obtained from a combination of liquid crystal and polymer. Liquid crystal molecules accord the polymer dispersed liquid crystal film notable electro-optic properties and make it attract wide attention and obtain a broad application prospect. The polymer dispersed blue phase presents anisotropy when powered up, and presents isotropy when not powered up; while a general polymer dispersed liquid crystal presents anisotropy when either powered up or not powered up.

The preparation method of the PDLC can be roughly divided into a phase separation method and a micro encapsulation method, and the phase separation method is more applied. The phase separation method mainly comprises polymerization induced phase separation, thermally induced phase separation, and solvent induced phase separation. The polymerization induced phase separation method is valued due to advantages of simple manageable process, fast curing speed, less toxicity and the like, and is widely used in the industrial production. According to different curing conditions, the polymerization induced phase separation method is further divided into three kinds: thermocuring, ultraviolet-light curing, and electron beam curing. The preparation method of the PDBP is the same as that of the PDLC.

Figure 3:
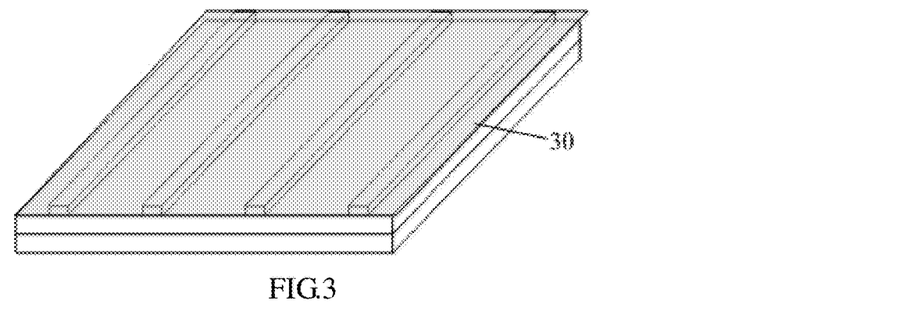
FIG. 3 is a schematic view after a polymer dispersed blue phase layer is provided on the array substrate obtained in FIG. 2 in an embodiment of the present invention.

As illustrated in FIG. 3, the polymer dispersed blue phase system 30 is formed on the array substrate obtained in FIG. 2 by using a spin-coating or a one drop fill method. The method of preparing the polymer dispersed blue phase system 30 mainly adopts the commonly used polymerization induced phase separation method in the existing technology. Herein, different methods can also be used to prepare the polymer dispersed blue phase system according to the need of the actual process.

Figure 4:
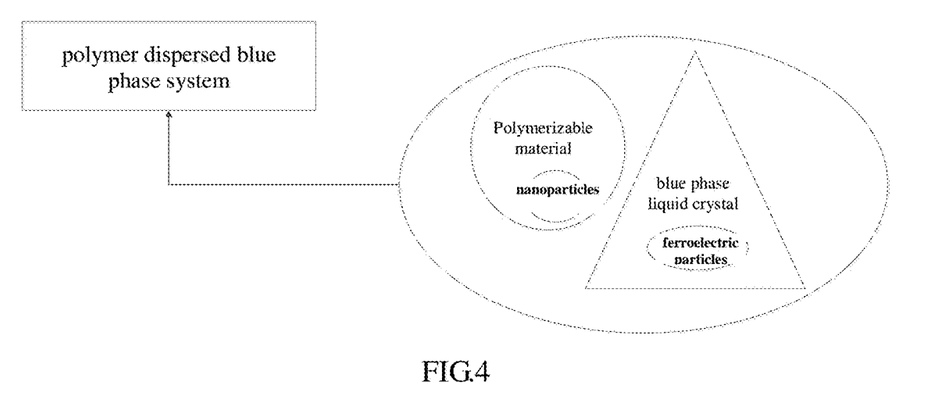
FIG. 4 is a schematic diagram illustrating the substances included in a polymer dispersed blue phase system in an embodiment of the present invention.

As illustrated in FIG. 4, the polymer dispersed blue phase system comprises polymerizable material and blue phase liquid crystal. The polymerizable material comprises nanoparticles, for example, the content of which is 0.5% wt of the polymer system; and the blue phase liquid crystal comprises ferroelectric particles, for example, the content of which is 0.3% wt of the blue phase liquid crystal. Further, the polymerizable material in the polymer dispersed blue phase system in the embodiment of the present invention is mainly a polymer system of acrylates, allyloxy benzoates or the like that comprise a polymerizable group, and the blue phase liquid crystal is mainly nematic liquid crystal doped with a chiral agent (the content is 0.1% wt of the nematic liquid crystal system) or a polymer system comprising an active double bond.

Figure 5:
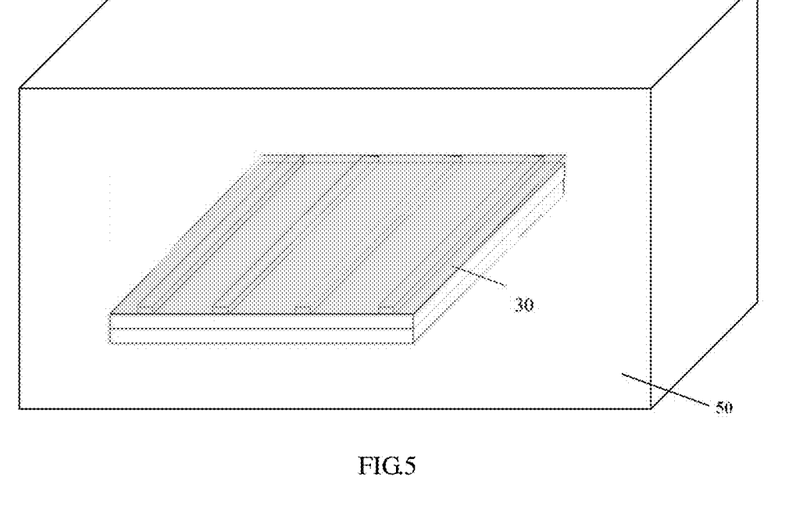
FIG. 5 is a schematic view when a themocuring process is performed to an array substrate and a polymer dispersed blue phase layer in an embodiment of the present invention.

As illustrated in FIG. 5, a thermocuring method is used for the entirety of the array substrate obtained in FIG. 3 and the polymer dispersed blue phase system 30 to cure the polymer dispersed blue phase system; during the thermocuring process, a heat source 50 is a closed system, and can provide a constant temperature at 230° C.; the curing temperature is 230±5° C., and the curing time is 30±5 min; and the polymer dispersed blue phase layer is obtained after the curing process. Further, the curing temperature and the curing time during the thermocuring process are not limited to the curing temperature and the curing time provided in the embodiment of the present invention; the curing temperature and the curing time can be adjusted rationally according to the actual process requirements; and the themocuring process can also be not performed to the entirety of the obtained array substrate and polymer dispersed blue phase system.

Figure 6:
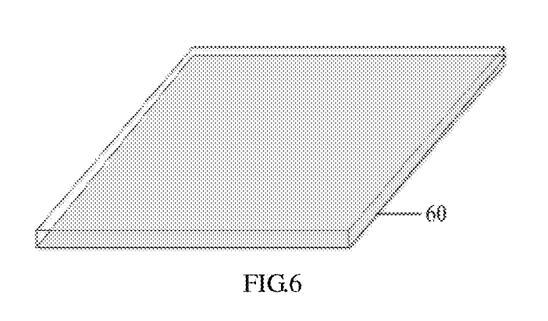
FIG. 6 is a schematic view illustrating a color filter substrate fabricated in an embodiment of the present invention.

The fabricated color filter substrate is illustrated in FIG. 6. When a color filter substrate is fabricated, a normal alignment layer PI layer 60 is used and a rubbing process is performed to the PI layer; and the specific process of fabricating the color filter substrate can be the same as the conventional technology, and the detailed description thereof is omitted herein.

Figure 7:
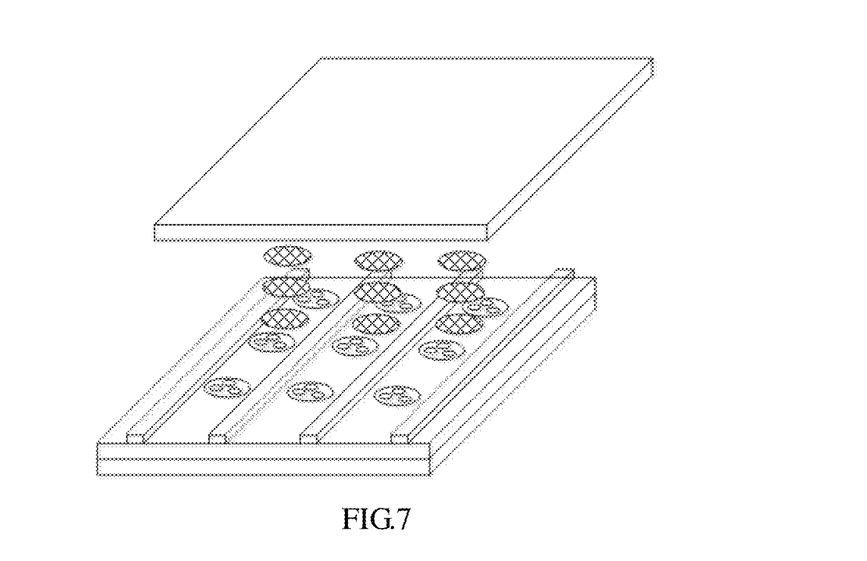
FIG. 7 is a schematic view illustrating a liquid crystal cell fabricated in an embodiment of the present invention.

As illustrated in FIG. 7, the liquid crystal is dripped onto the array substrate and the polymer dispersed blue phase layer subjected to the thermocuring process in FIG. 5 through the ODF method, and sealant is applied onto the color filter substrate obtained in FIG. 6, followed by performing an assembly process to the array substrate dripped with the liquid crystal and the color filter substrate provided with the sealant, and a liquid crystal cell is obtained after the assembly.

Figure 8:
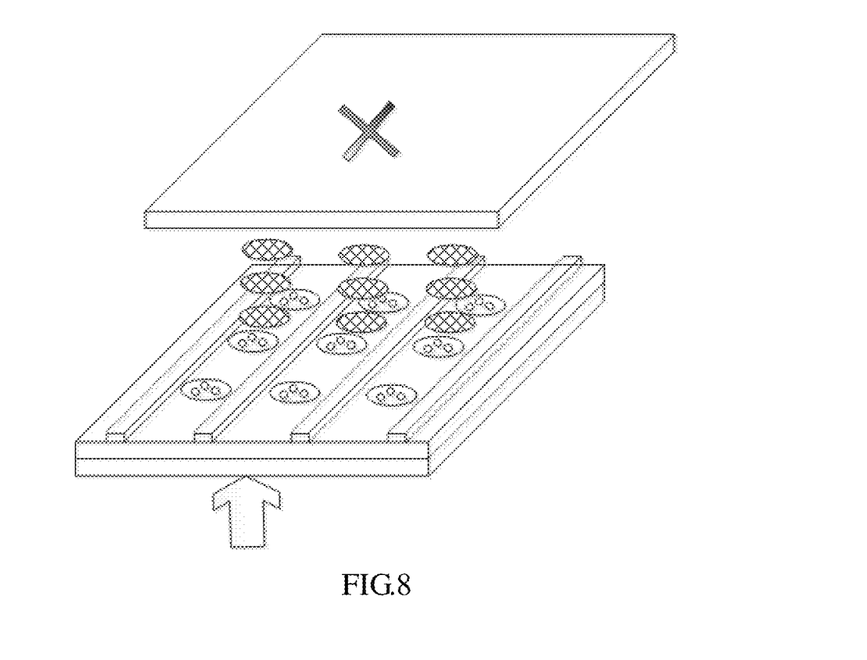
FIG. 8 is a schematic view illustrating a liquid crystal cell in a dark state in an embodiment of the present invention.

As illustrated in FIG. 8, when the array substrate is not powered up, the blue phase liquid crystal in the polymer dispersed blue phase system presents isotropy, so that the light emitted from a backlight source cannot pass through the liquid crystal cell, and the liquid crystal cell is in a dark state; because the blue phase liquid crystal in the polymer dispersed blue phase system is distributed evenly, the light leakage phenomenon is not generated in the dark state.

Figure 9:
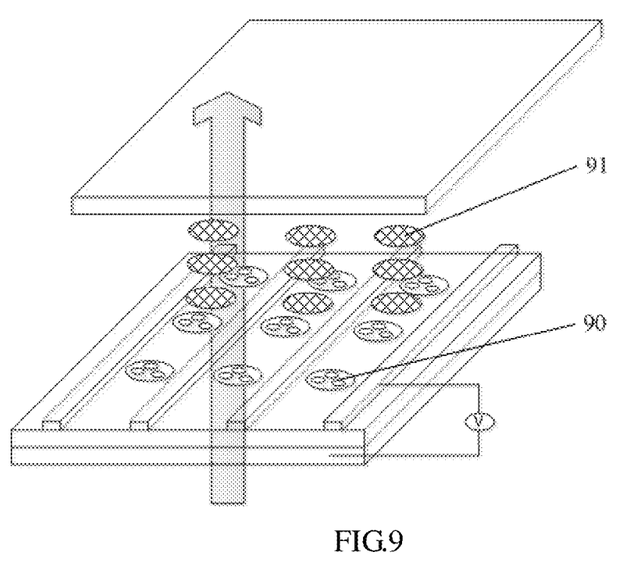
FIG. 9 is a schematic view illustrating a liquid crystal cell in a bright state in an embodiment of the present invention.

As illustrated in FIG. 9, when the array substrate is powered up, the blue phase liquid crystal 90 in the polymer dispersed blue phase system becomes anisotropic due to the effect of an electric field; the blue phase liquid crystal layer in the polymer dispersed blue phase system is arranged along the direction of the electric field, and performs an alignment function for the liquid crystal molecules (the common liquid crystal molecules 91) on the polymer dispersed blue phase layer; and meanwhile the anisotropic blue phase liquid crystal makes the light emitted from the backlight source able to pass through the polymer dispersed blue phase layer and the liquid crystal cell, realizing a bright state.

An embodiment of the present invention provides a display device, which comprises the aforementioned liquid crystal panel.

Preferably, the polymer dispersed blue phase layer in the liquid crystal panel included in the display device may be a polymer dispersed blue phase layer not subjected to a themocuring process, and may also be a polymer dispersed blue phase layer subjected to a themocuring process.

In summary, in the technical solutions provided by the embodiment of the present invention, a polymer dispersed blue phase layer is provided on an array substrate; and at least two electrodes are provided on the array substrate, configured to form an electric field on the surface of the array substrate; and a cell-assembly process is performed with the array substrate on which the polymer dispersed blue phase layer is provided and an opposing substrate to form a liquid crystal cell. The polyimide layer on an array substrate in the conventional technology is replaced by the polymer dispersed blue phase layer provided on the array substrate, and meanwhile the rubbing process in the current technology is omitted. The embodiments can not only generates a precise alignment to the liquid crystal molecules of the array substrate, but also can resolve the problem of the dark-state light leakage of a liquid crystal panel, and thus improves the whole competitiveness of the liquid crystal panel.

What are described above is related to the illustrative embodiments of the disclosure only and not limitative to the scope of the disclosure; the scopes of the disclosure are defined by the accompanying claims.

The invention claimed is:

1. A liquid crystal panel, comprising: an array substrate an opposing substrate that is opposite to the array substrate, a liquid crystal arranged between the array substrate and the opposing substrate, wherein a polymer dispersed blue phase layer configured to serve as an alignment layer is provided on the array substrate; and at least two electrodes are provided on the array substrate.

2. The liquid crystal panel as claimed according to claim 1, wherein the polymer dispersed blue phase system comprises polymerizable material and blue phase liquid crystal.

3. The liquid crystal panel as claimed according to claim 2, wherein the blue phase liquid crystal of the polymer dispersed blue phase system comprises ferroelectric particles.

4. The liquid crystal panel as claimed according to claim 3, wherein a content of the ferroelectric particles in the blue phase liquid crystal is 0.3% wt of the blue phase liquid crystal.

5. The liquid crystal panel as claimed according to claim 4, wherein the polymerizable material of the polymer dispersed blue phase system comprises nanoparticles.

6. The liquid crystal panel as claimed according to claim 5, wherein a content of the nanoparticles of the polymerizable material is 0.5% wt of the polymerizable material.

7. The liquid crystal panel as claimed according to claim 3, wherein the polymerizable material of the polymer dispersed blue phase system comprises nanoparticles.

8. The liquid crystal panel as claimed according to claim 7, wherein a content of the nanoparticles of the polymerizable material is 0.5% wt of the polymerizable material.

9. The liquid crystal panel as claimed according to claim 2, wherein the polymerizable material of the polymer dispersed blue phase system comprises nanoparticles.

10. The liquid crystal panel as claimed according to claim 9, wherein a content of the nanoparticles of the polymerizable material is 0.5% wt of the polymerizable material.

11. A method of manufacturing the liquid crystal panel as claimed according to claim 1, comprising:
    providing the polymer dispersed blue phase layer on the array substrate; wherein at least two electrodes are provided on the array substrate; and
    performing a cell-assembly process with the array substrate on which the polymer dispersed blue phase layer is provided and the opposing substrate to form a liquid crystal cell.

12. The method as claimed according to claim 11, wherein a polymer dispersed blue phase system is provided on the array substrate, the polymer dispersed blue phase system is cured, and thus the polymer dispersed blue phase layer is obtained.

13. The method as claimed according to claim 12, wherein a thermocuring process is used to cure the polymer dispersed blue phase system; and a thermocuring temperature is 230±5° C., and a thermocuring time is 30±5 min.

14. The method as claimed according to claim 13, wherein providing the polymer dispersed blue phase layer on the array substrate comprises:
    performing a spin-coating process to provide the polymer dispersed blue phase system on the array substrate; or,
    using a one drop fill method to provide the polymer dispersed blue phase system on the array substrate.

15. The method as claimed according to claim 12, wherein providing the polymer dispersed blue phase layer on the array substrate comprises:
    performing a spin-coating process to provide the polymer dispersed blue phase system on the array substrate; or,
    using a one drop fill method to provide the polymer dispersed blue phase system on the array substrate.

16. A display device, comprising the liquid crystal panel as claimed in claim 1.

* * * * *